US012589434B2

(12) United States Patent
Murakami et al.

(10) Patent No.: US 12,589,434 B2
(45) Date of Patent: Mar. 31, 2026

(54) ALUMINUM PARTICLE GROUP AND METHOD FOR MANUFACTURING THE SAME

(71) Applicant: TOYO ALUMINIUM KABUSHIKI KAISHA, Osaka (JP)

(72) Inventors: Isao Murakami, Osaka (JP); Jun Kusui, Osaka (JP); Takamasa Tanaka, Osaka (JP); Kenta Ishigami, Osaka (JP)

(73) Assignee: TOYO ALUMINIUM KABUSHIKI KAISHA, Osaka (JP)

( * ) Notice: Subject to any disclaimer, the term of this patent is extended or adjusted under 35 U.S.C. 154(b) by 355 days.

(21) Appl. No.: 16/344,261

(22) PCT Filed: Oct. 24, 2016

(86) PCT No.: PCT/JP2016/081478
§ 371 (c)(1),
(2) Date: Apr. 23, 2019

(87) PCT Pub. No.: WO2018/078701
PCT Pub. Date: May 3, 2018

(65) Prior Publication Data
US 2020/0180022 A1 Jun. 11, 2020

(51) Int. Cl.
*B22F 9/08* (2006.01)
*B22F 1/052* (2022.01)
(Continued)

(52) U.S. Cl.
CPC .............. *B22F 9/082* (2013.01); *B22F 1/052* (2022.01); *B22F 1/065* (2022.01); *B22F 10/28* (2021.01);
(Continued)

(58) Field of Classification Search
CPC ...... B22F 2301/052; B22F 12/67; B22F 1/00; B22F 1/05; B22F 1/052; B22F 1/06;
(Continued)

(56) References Cited

U.S. PATENT DOCUMENTS 5,605,558 A 2/1997 Yamagata et al.
6,126,711 A * 10/2000 Kusui ................. C22C 32/0036
148/513
(Continued)

FOREIGN PATENT DOCUMENTS

CN 103252495 A 8/2013
JP 4-154902 A 5/1992
(Continued)

OTHER PUBLICATIONS

M. Wang, Y. Huang, W. Tseng and K. Lai, "Comparison of gas atomization on A6060 Al alloy powders produced by internal and external mixing type nozzles," 2016 IEEE International Conference on Industrial Technology (ICIT), 2016, pp. 2157-2162, doi: 10.1109/ICIT.2016.7475104. (Year: 2016).*
(Continued)

*Primary Examiner* — John A Hevey

(74) *Attorney, Agent, or Firm* — Birch, Stewart, Kolasch & Birch, LLP

(57) ABSTRACT

An aluminum particle group composed of aluminum particles, as observed in an image thereof obtained through a scanning electron microscope, has an average circularity of 0.75 or more, and an average particle diameter of $D_{50}$ of 10 μm or more and less than 100 μm, and satisfies $A \times 3 \leq B$ and also satisfying $D < C$ where A represents the number of aluminum particles having a diameter of less than 5 μm, B represents the number of aluminum particles having a diameter of 10 μm or more, C represents the number of aluminum (Continued)

particles with no satellite, and D represents the number of aluminum particles having satellites.

8 Claims, 16 Drawing Sheets

(51) Int. Cl.

| | |
|---|---|
| B22F 1/065 | (2022.01) |
| B22F 10/28 | (2021.01) |
| B22F 10/68 | (2021.01) |
| B22F 12/67 | (2021.01) |
| B33Y 70/00 | (2020.01) |
| B22F 10/70 | (2021.01) |

(52) U.S. Cl.
CPC .............. *B22F 12/67* (2021.01); *B33Y 70/00* (2014.12); *B22F 2009/0896* (2013.01); *B22F 10/68* (2021.01); *B22F 10/70* (2021.01); *B22F 2207/13* (2013.01); *B22F 2301/052* (2013.01); *B22F 2304/10* (2013.01)

(58) Field of Classification Search
CPC .... B22F 1/065; B22F 9/00; B22F 9/02; B22F 9/06; B22F 9/08; B22F 9/082; B22F 2009/0824–0896; B22F 2207/11; B22F 2207/13; B22F 2304/10; B22F 10/28; B22F 10/68; B22F 10/70; B33Y 70/00; Y02P 10/25
See application file for complete search history.

(56) References Cited

U.S. PATENT DOCUMENTS

| | | | | |
|---|---|---|---|---|
| 6,517,602 | B2 * | 2/2003 | Sato ................... | B23K 35/0244 |
| | | | | 75/255 |
| 8,894,739 | B1 * | 11/2014 | Johnson ..................... | B01J 2/30 |
| | | | | 75/255 |
| 2001/0055696 | A1 | 12/2001 | Furuichi | |
| 2003/0215348 | A1 | 11/2003 | Ichikawa et al. | |
| 2004/0182201 | A1 | 9/2004 | Fuwa et al. | |
| 2010/0143185 | A1 * | 6/2010 | Pandey ................... | B22F 9/082 |
| | | | | 420/528 |
| 2011/0085932 | A1 | 4/2011 | Pandey | |
| 2014/0348691 | A1 | 11/2014 | Ljungblad et al. | |
| 2016/0175929 | A1 * | 6/2016 | Colin ................... | B23K 26/342 |
| | | | | 219/76.12 |
| 2018/0126457 | A1 * | 5/2018 | Hou ........................ | B33Y 70/00 |

FOREIGN PATENT DOCUMENTS

| | | | |
|---|---|---|---|
| JP | 6-145710 | A | 5/1994 |
| JP | 8-92681 | A | 4/1996 |
| JP | 9-137207 | A | 5/1997 |
| JP | 11-302701 | A | 11/1999 |
| JP | 2002-80980 | A | 3/2002 |
| JP | 2003-328053 | A | 11/2003 |
| JP | 2004-277877 | A | 10/2004 |
| JP | 2012-52223 | A | 3/2012 |
| JP | 2016-53198 | A | 4/2016 |
| JP | 2016-108219 | A | 6/2016 |
| JP | 2016-532773 | A | 10/2016 |
| WO | WO 2015/001241 | A2 | 1/2015 |

OTHER PUBLICATIONS

Chinese Office Action and Search Report for Chinese Application No. 201680090156.0, dated Sep. 3, 2020, with English translation of the Office Action.

Japanese Decision to Grant Patent for Japanese Application No. 2015-189766, dated Oct. 27, 2020, with English translation.

International Search Report (PCT/ISA/210) issued in PCT/JP2016/081478, dated Jan. 24, 2017.

Bauer et al., "Investigations on Aging Behaviour of Aluminum Powders During a Lifetime Simulation for the LBM Process," European Powder Metallurgy Association (EPMA), Oct. 9, 2016, 6 pages.

Extended European Search Report for European Application No. 16919853.8, dated May 11, 2020.

Sun et al., "Microstructure and mechanical properties of Al—Fe—V—Si aluminum alloy produced by electron beam melting," Materials Science & Engineering A, vol. 659, 2016 (published online Feb. 19, 2016), pp. 207-214.

Thomas et al., "Role of Metal Powder Characteristics in Additive Manufacturing," European Powder Metallurgy Association (EPMA), Oct. 9, 2016, 3 pages.

Wang et al., "Comparison of Gas Atomization on A6060 Al Alloy Powders Produced by Internal and External Mixing Type Nozzles," IEEE International Conference on Industrial Technology (ICIT), Mar. 14, 2016, pp. 2157-2162.

Chinese Office Action and Search Report for Chinese Application No. 201680090156.0, dated Mar. 31, 2021, with English translation of the Office Action.

Qing et al., "Engineering Materials and Machinery Manufacturing Fundamentals," Huazhong University of Science and Technology Press, 1st edition, Jun. 2016, p. 175 (3 pages total).

* cited by examiner

FIG.1

ALUMINUM PARTICLE GROUP AND METHOD FOR MANUFACTURING THE SAME

CROSS REFERENCE TO RELATED APPLICATIONS

This application is the National Phase of PCT International Application No. PCT/JP2016/081478, filed on Oct. 24, 2016, which is hereby expressly incorporated by reference into the present application.

TECHNICAL FIELD

The present invention relates to an aluminum particle group and a method for manufacturing the aluminum particle group, and more specifically to an aluminum particle group suitable for a raw material powder used in a powder bed fusion 3D printer for additively manufacturing an object and a method for manufacturing the aluminum particle group.

BACKGROUND ART

As a processing technology capable of forming various shapes without using a die, additive manufacturing using a 3D printer attracts attention. When a 3D printer is used with metal powder as raw material powder, powder bed fusion is suitably employed. Through powder bed fusion, an object is additively manufactured as follows:

Initially, metal powder is spread to have a determined thickness. Subsequently, this layer of powder (or a powder bed) is locally exposed to a laser or electron beam. As a result, the raw material powder exposed to the beam is melted and sintered to form an additively manufactured (AM) layer. Adding such AM layers provides an additively manufactured object as desired.

In order to obtain a defect-free shaped object in the additive manufacturing method as described above, it is necessary to select an appropriate raw material powder. This is because the raw material powder's various properties such as fluidity, wettability when it is melted, strength, workability and the like significantly affect the formation of stacked layers and AM layers and hence contribute to the resultant additively manufactured object in perfection.

For example, Japanese Patent Laying-Open No. 2004-277877 (PTL 1) discloses a metal powder composed of nickel powder, copper powder and graphite powder for additive manufacturing. PTL 1 describes that when this metal powder is melted it can exhibit high wettability, and it can enhance additive manufacturability for powder bed fusion and also reduce micro-cracking in a resultant additively manufactured object.

CITATION LIST

Patent Literature

PTL 1: Japanese Patent Laying-Open No. 2004-277877

SUMMARY OF INVENTION

Technical Problem

However, the additively manufactured object formed using the metal powder of PTL 1 will necessarily include a carbon content, and accordingly, its practical use is limited.

Furthermore, PTL 1 is silent on improvement in property other than wettability. For this reason, there still is large room for improvement of raw material powders used in 3D printers for additively manufacturing objects.

The present invention has been made in view of the above circumstances, and it is an object of the present invention to provide an aluminum particle group suitable for a raw material powder used in a powder bed fusion 3D printer for additively manufacturing an object and a method for manufacturing the aluminum particle group.

Solution to Problem

An aluminum particle group according to one aspect of the present invention is an aluminum particle group composed of aluminum particles, and in an image of the aluminum particle group as observed with a scanning electron microscope, the aluminum particle group has an average circularity of 0.75 or more and an average particle diameter $D_{50}$ of 10 μm or more and less than 100 μm, and when the number of aluminum particles having a diameter of less than 5 μm is represented as A, the number of aluminum particles having a diameter of 10 μm or more is represented as B, the number of aluminum particles with no satellite is represented as C, and the number of aluminum particles having a satellite is represented as D, the aluminum particle group satisfies $A \times 3 \leq B$ and also satisfies $D < C$.

More preferably, the aluminum particle group has an average particle diameter $D_{50}$ of 20 μm or more and less than 60 μm.

Preferably, when the aluminum particle group is heaped on a surface having an arithmetic average roughness Ra of 0.3 μm or more and 0.4 μm or less to form a hemispherical particle aggregate having a diameter of 6.8 mm and a height of 3.4 mm and the particle aggregate is spread in one direction by using a doctor blade spaced from the surface by 1 mil, the aluminum particle group is spread by a distance of less than 20 cm.

Preferably, the aluminum particle group has an angle of repose of 40° or less.

The aluminum particle group can be suitably used as a raw material powder used in a powder bed fusion 3D printer for additively manufacturing an object.

A method for manufacturing an aluminum particle group comprises: producing an atomized-particle group by an air open type gas atomization method; subsequently removing fine particles from the atomized-particle group through dry air classification; and subsequently removing coarse particles from the atomized-particle group by using a sieve having meshes of 40 μm or more and 75 μm or less.

Advantageous Effects of Invention

The present aluminum particle group is excellent in fluidity and thus suitable for a raw material powder used in a powder bed fusion 3D printer for additively manufacturing an object.

BRIEF DESCRIPTION OF DRAWINGS

FIG. 1 shows an example of an observed image.

DESCRIPTION OF EMBODIMENTS

Figure 2A:
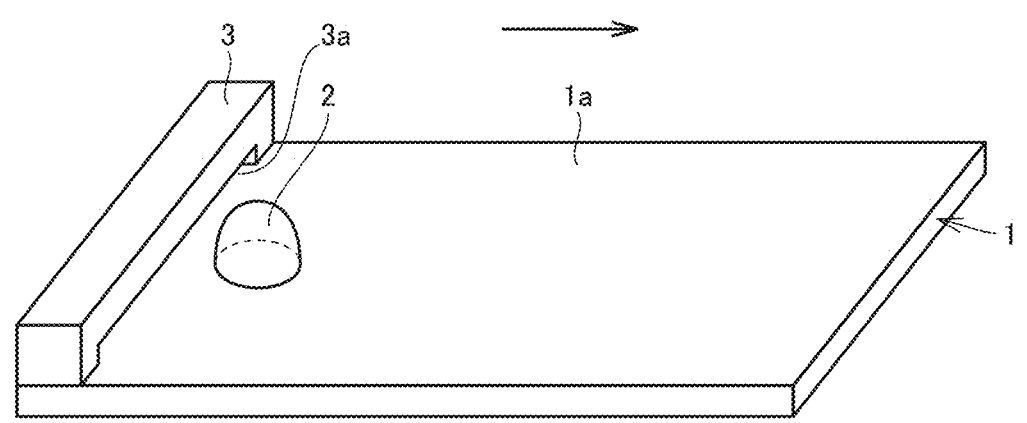
FIG. 2A is a schematic perspective view for illustrating a method for confirming an aluminum particle group's fluidity.

Hereinafter, an embodiment is described. In any drawing used for describing the embodiment, identical reference characters denote identical or equivalent components.

[Aluminum Particle Group]

An aluminum particle group according to the present embodiment is composed of aluminum particles characterized in that in an image of the aluminum particle group as observed with a scanning electron microscope, the aluminum particle group has an average circularity of 0.75 or more, and when the number of aluminum particles having a diameter of less than 5 μm is represented as A, the number of aluminum particles having a diameter of 10 μm or more is represented as B, the number of aluminum particles with no satellite is represented as C, and the number of aluminum particles having a satellite is represented as D, the aluminum particle group satisfies $A \times 3 \leq B$ and also satisfies $D < C$.

The above "aluminum particles" are made of aluminum having a purity of 99.7% by mass or more (i.e., so-called pure aluminum), or an aluminum alloy containing aluminum (Al) as a major component. The aluminum alloy is exemplified by aluminum alloys of 1000 to 8000 series and in addition, theses aluminum alloys with an element other than Al added thereto. Preferable other elements include silicon (Si), zinc (Zn), chromium (Cr), manganese (Mn), magnesium (Mg) and copper (Cu).

For the amount of each blended component of the aluminum alloy other than Al, for example, Si is blended preferably at a ratio of 40% by mass or less, and more preferably 10% by mass or less with respect to 100% by mass of the aluminum alloy. Mg is blended preferably at a ratio of 10% by mass or less. Further, any component other than Al and Mg is also preferably blended at a ratio of 10% by mass or less.

The aluminum particles' composition, that is, whether it is pure aluminum or an alloy, and if it is an alloy, at what ratio each component is blended, can be quantitatively determined by high frequency inductively coupled plasma (ICP) spectrometry.

The "observed image" described above is obtained as follows: Initially, a sample in which 100 to 50,000 aluminum particles are fixed on a surface of a stage for observation is prepared. On the surface of the stage, the aluminum particles are dispersed without overlapping each other. Such a sample for observation can be prepared, for example, by disposing a double-sided tape on the surface of the stage, dropping aluminum particles on an exposed surface of the exposed double-sided tape, and removing excessive aluminum particles with air or the like.

Subsequently, the sample for observation is observed with a scanning electron microscope (SEM), and the magnification is adjusted so that 15 or less aluminum particles are included in one field of view, and a photograph thereof is thus captured. This photograph will serve as the "observed image." At least ten or more such photographs are obtained for one sample for observation and the photographs are connected together to observe the sample for observation entirely.

One field of view has a vertical size and a horizontal size, which are each 4 to 12 times of an average particle diameter $D_{50}$ (a 50% particle diameter) of the aluminum particle group. For example, when the aluminum particles have a $D_{50}$ of 50 μm, one field of view will have a vertical size and a horizontal size each of 200 to 600 μm (200 μm or more and 600 μm or less). The above $D_{50}$ is calculated from a result of volumetric cumulative particle size distribution of the aluminum particle group measured through laser diffraction.

The aluminum particle group's "average circularity" is calculated as follows:

Initially, 10 or more images of one sample for observation are observed to randomly extract 100 or more aluminum particles therefrom. Subsequently, an image analysis is conducted to measure each extracted aluminum particle's area ($\mu m^2$) and circumferential length ($\mu m$). By substituting each measured area's value and each measured circumferential length's value for them in a calculation formula of {circularity=$4 \times \pi \times$(area)/(circumferential length)$^2$}, the 100 or more aluminum particles' respective circularities are calculated and their average value is defined as an "average circularity."

"The number of aluminum particles having a diameter less than 5 $\mu m$" and "the number of aluminum particles having a diameter of 10 $\mu m$ or more" represented as A and B, respectively, are calculated as follows:

Initially, from the value of the area of each of the 100 or more aluminum particles extracted, each particle's equivalent circular diameter (Heywood diameter) is calculated. Of the aluminum particles, the number of aluminum particles having an equivalent circular diameter of less than 5 $\mu m$ is defined as "the number of aluminum particles having a diameter of less than 5 $\mu m$," and the number of aluminum particles having an equivalent circular diameter of 10 $\mu m$ or more is defined as "the number of aluminum particles having a diameter of 10 $\mu m$ or more."

"The number of aluminum particles with no satellite" and "the number of aluminum particles having satellites" represented as C and D, respectively, are determined as follows:

Initially, the extracted 100 or more aluminum particles are observed in appearance in an observed image. In the observed image, a particle visually observed as "consisting of a single particle" is defined as an "aluminum particle with no satellite." In contrast, two or more particles overlapping or contiguous to each other to form a particle cluster, that is, a "particle cluster composed of a plurality of aluminum particles visually observed such that their contours are continuous" in the observed image, is regarded as an "aluminum particle having a satellite."

Figure 1:
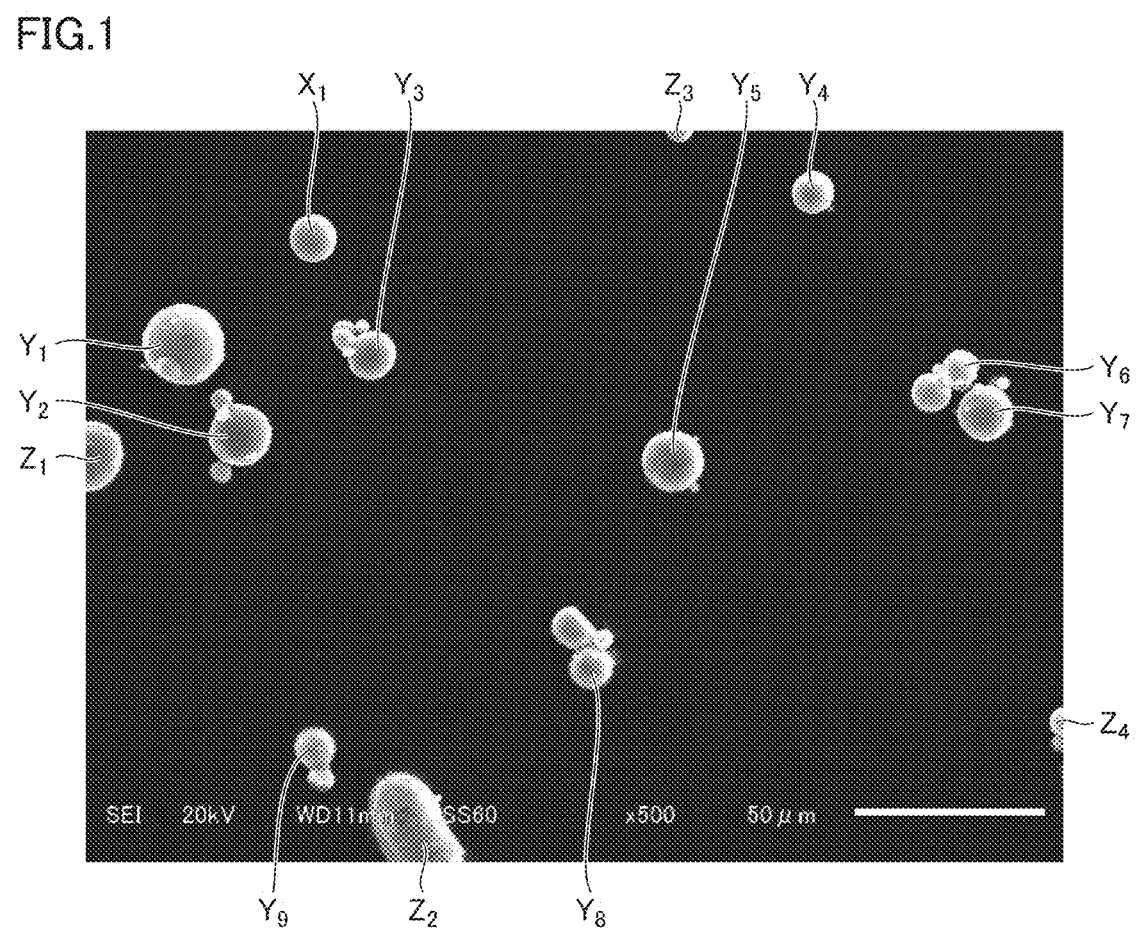

How an "aluminum particle with no satellite" is distinguished from an "aluminum particle having a satellite," as described above, will more specifically be described with reference to FIG. 1.

FIG. 1 shows an example of an observed image formed of a single field of view. In the observed image shown in FIG. 1, 14 aluminum particles denoted as $X_1$, $Y_1$ to $Y_9$, and $Z_1$ to $Z_4$ are observed. As can be seen from FIG. 1, in an observed image created under the above-described conditions, a possibility of actually individual aluminum particles overlapping each other so that they would look like forming a particle cluster is sufficiently reduced. In other words, to obtain such an observed image, magnification for observation is adjusted.

Referring to FIG. 1, $X_1$ is regarded as an "aluminum particle with no satellite" because two or more particles neither overlap nor are contiguous to each other and it is clearly recognized as a single particle. In contrast, $Y_1$ to $Y_9$ are each regarded as an "aluminum particle having a satellite" because it is recognized that two or more particles overlap each other or are contiguous to each other and also have their respective contours contiguous to each other. As can be seen from FIG. 1, these two types of particles are easily distinguished by visually inspecting the observed image.

Note that even aluminum particles determined as a particle cluster of two or more aluminum particles and regarded as an "aluminum particle having a satellite" still have a possibility that two or more aluminum particles only appear to overlap/be contiguous to each other. In this specification, such a case is also regarded as an "aluminum particle having a satellite."

Note that regarding $Z_1$ to $Z_4$ in FIG. 1, their respective, individual entire images cannot be confirmed in the observed image, and accordingly, although they are counted in counting to include 15 or less aluminum particles in one field of view, they are not subject to random sampling.

The aluminum particle group of the present embodiment has an average circularity of 0.75 or more and, with respect to the A to D indicated above, satisfies A×3≤B and also satisfies D<C, and can thus be excellent in fluidity.

Note that the "fluidity" of the aluminum particle group is a property relevant to whether the aluminum particle group can be spread uniformly at a high density within a desired region. That is, an aluminum particle group excellent in fluidity will be spread uniformly at a high density within a desired region. This fluidity can be confirmed by spreading shown in FIGS. 2A, 2B, 3A and 3B.

Figure 2B:
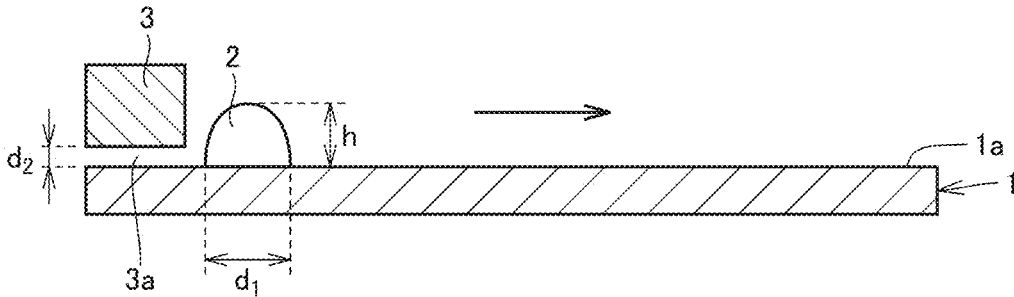
FIG. 2B is a cross-sectional view of FIG. 2A.

Initially, as shown in FIGS. 2A and 2B, a substrate 1 having a surface 1a with an arithmetic average roughness Ra of 0.3 to 0.4 $\mu m$ is prepared. Subsequently, the aluminum particle group is heaped up on surface 1a to form a hemi-spherical particle aggregate 2 having a diameter $d_1$ of 6.8 mm and a height h of 3.4 mm. Specifically, the aluminum particle group is dropped by gravity into a metallic mold having a hemispherical internal space having a diameter $d_1$ of 6.8 mm and a height h of 3.4 mm. Subsequently, the aluminum particle group has wiped away the portion outside the mold, and this mold is then turned upside down (that is, the aluminum particle group filling the internal space is brought into contact with surface 1a) to place the aluminum particle group on surface 1a to stand still. In doing so, the mold is not removed from surface 1a. Thereafter, the mold is moved to exactly above surface 1a. Thus, hemispherical particle aggregate 2 is formed.

Arithmetic mean roughness Ra indicated above can be obtained in a method specified in JIS B 0031·JIS B 0061. In addition, the term "hemispherical" does not mean only a half of a true sphere, and includes a substantially hemispherical shape which is referred to as being hemispherical.

Figure 3A:
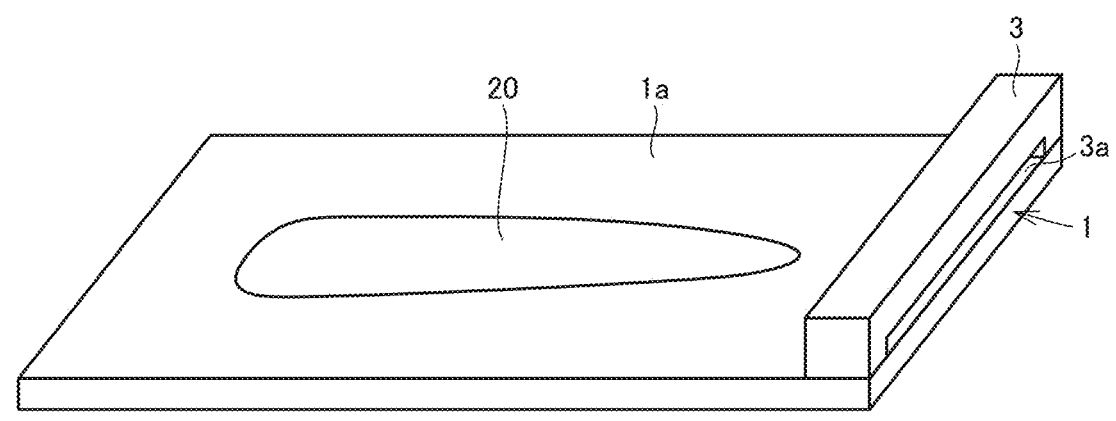
FIG. 3A is a schematic perspective view for illustrating a method for confirming an aluminum particle group's fluidity.
Figure 3B:
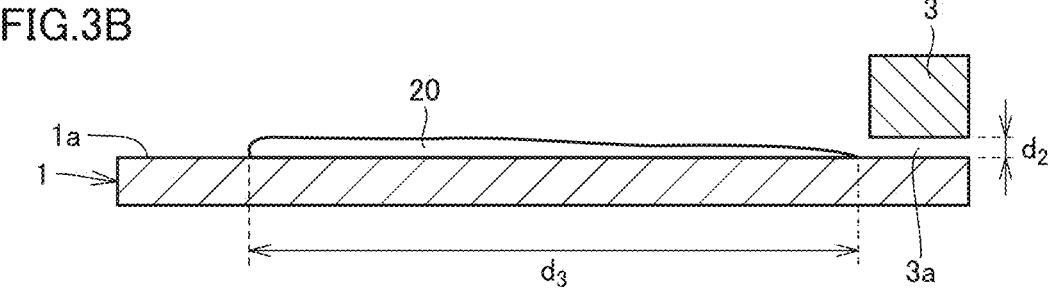
FIG. 3B is a cross-sectional view of FIG. 3A.
Figure 4A:
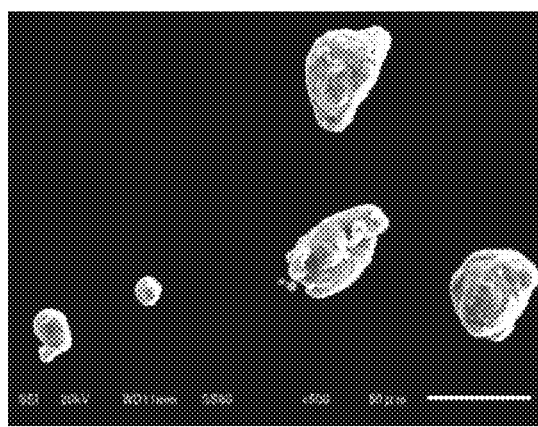
FIG. 4A is an example of an observed image of an aluminum particle group of Example 1.
Figure 4B:
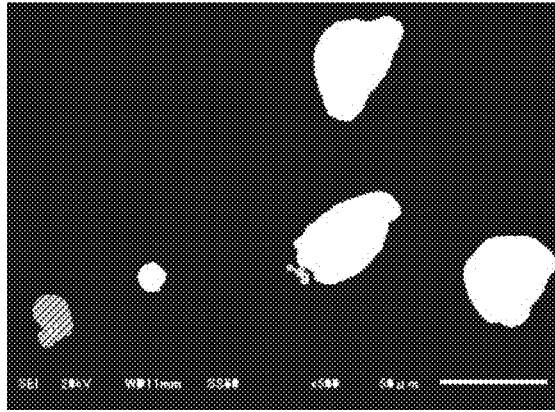
FIG. 4B is an image obtained by binarizing FIG. 4A and hatching aluminum particles determined as aluminum particles having satellites.
Figure 5A:
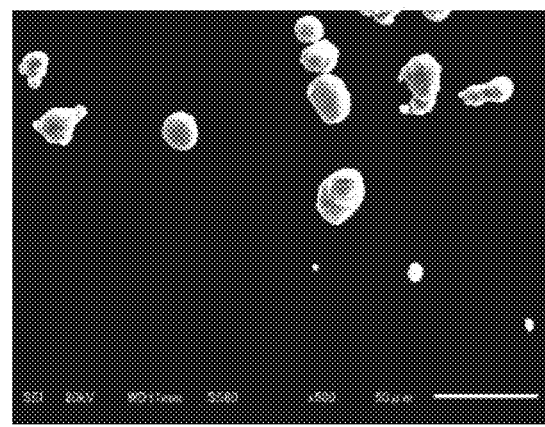
FIG. 5A is an example of an observed image of an aluminum particle group of Example 1.
Figure 5B:
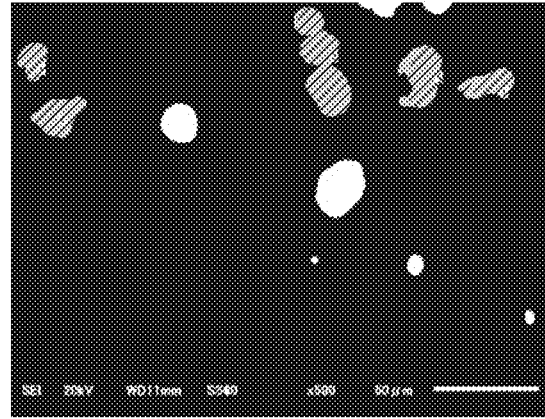
FIG. 5B is an image obtained by binarizing FIG. 5A and hatching aluminum particles determined as aluminum particles having satellites.
Figure 6A:
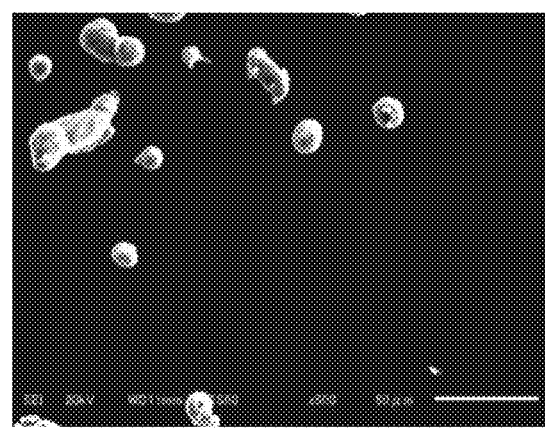
FIG. 6A is an example of an observed image of an aluminum particle group of Example 1.
Figure 6B:
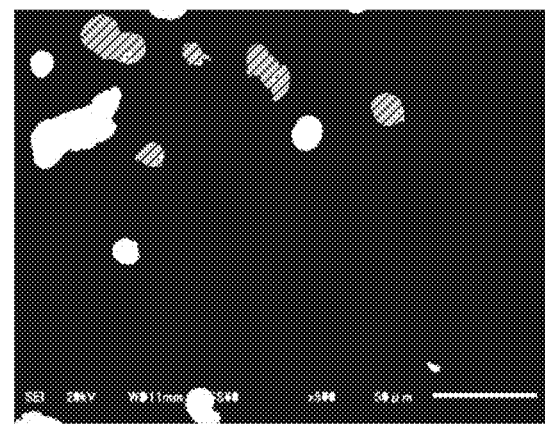
FIG. 6B is an image obtained by binarizing FIG. 6A and hatching aluminum particles determined as aluminum particles having satellites.
Figure 7A:
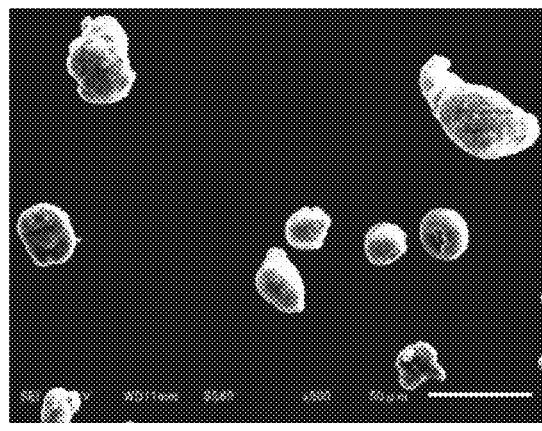
FIG. 7A is an example of an observed image of an aluminum particle group of Example 1.
Figure 7B:
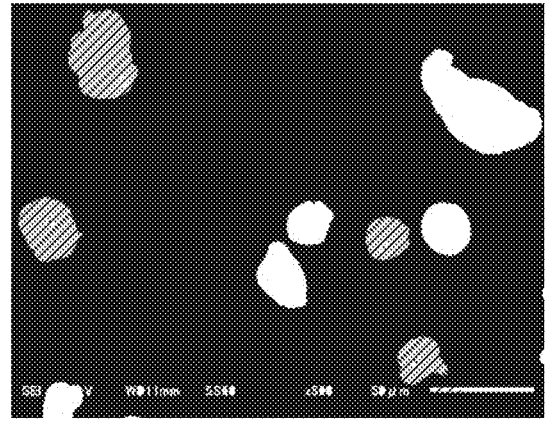
FIG. 7B is an image obtained by binarizing FIG. 7A and hatching aluminum particles determined as aluminum particles having satellites.
Figure 8A:
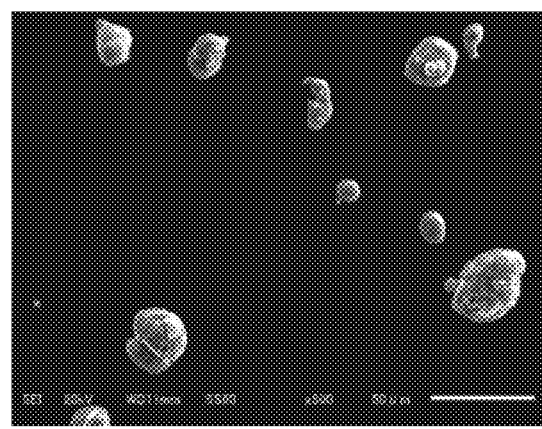
FIG. 8A is an example of an observed image of an aluminum particle group of Example 1.
Figure 8B:
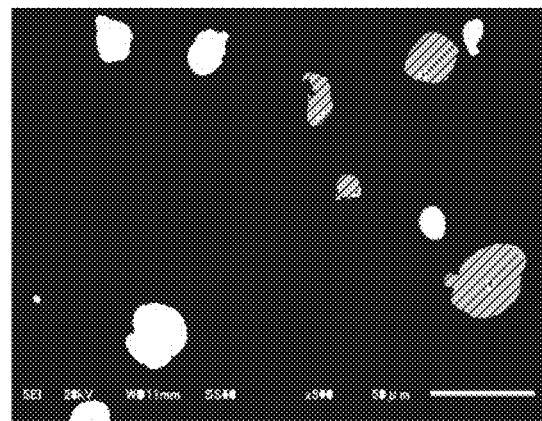
FIG. 8B is an image obtained by binarizing FIG. 8A and hatching aluminum particles determined as aluminum particles having satellites.
Figure 9A:
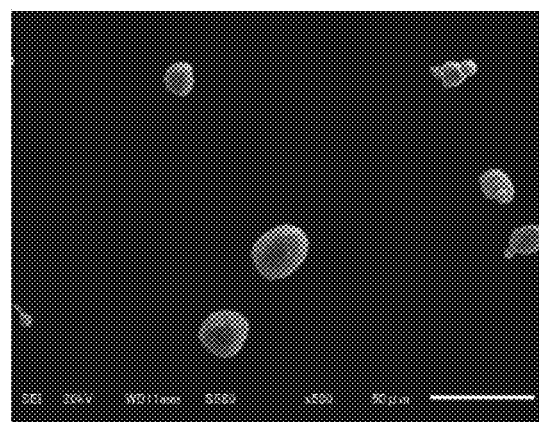
FIG. 9A is an example of an observed image of an aluminum particle group of Example 1.
Figure 9B:
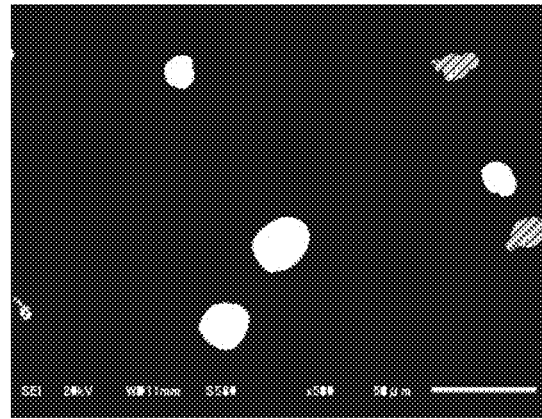
FIG. 9B is an image obtained by binarizing FIG. 9A and hatching aluminum particles determined as aluminum particles having satellites.
Figure 10A:
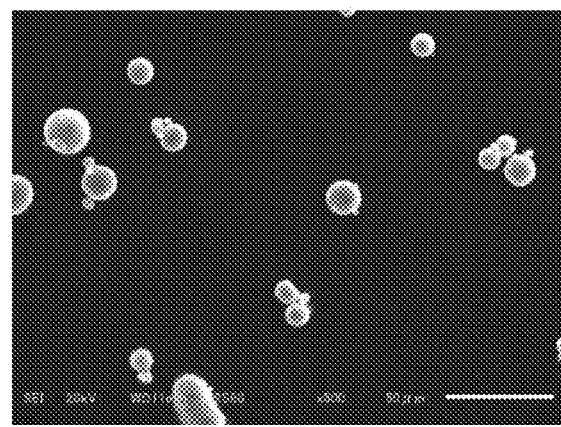
FIG. 10A is an example of an observed image of an aluminum particle group of comparative example 1.
Figure 10B:
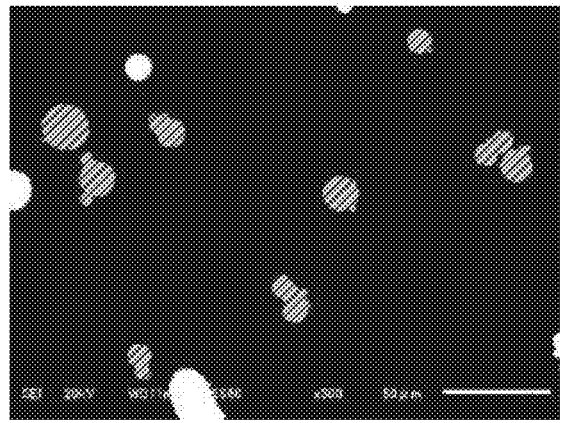
FIG. 10B is an image obtained by binarizing FIG. 10A and hatching aluminum particles determined as aluminum particles having satellites.
Figure 11A:
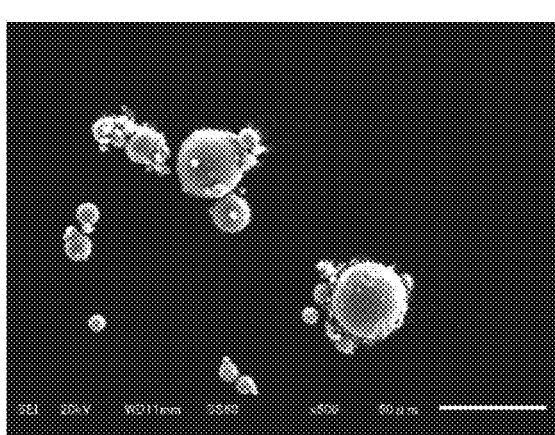
FIG. 11A is an example of an observed image of an aluminum particle group of comparative example 1.
Figure 11B:
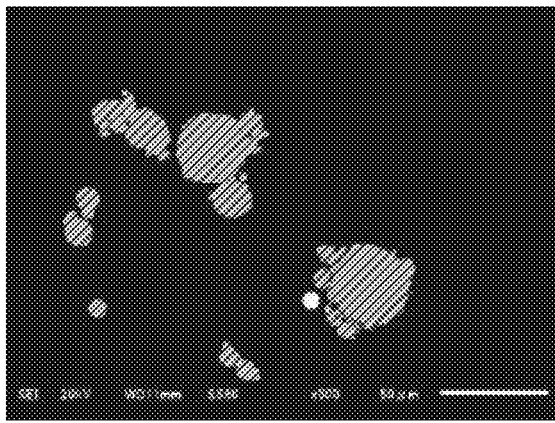
FIG. 11B is an image obtained by binarizing FIG. 11A and hatching aluminum particles determined as aluminum particles having satellites.
Figure 12A:
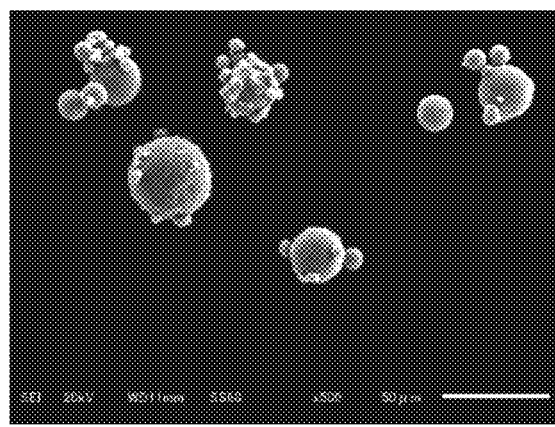
FIG. 12A is an example of an observed image of an aluminum particle group of comparative example 1.
Figure 12B:
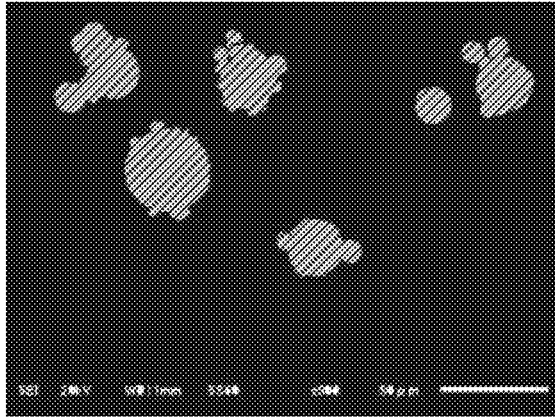
FIG. 12B is an image obtained by binarizing FIG. 12A and hatching aluminum particles determined as aluminum particles having satellites.
Figure 13A:
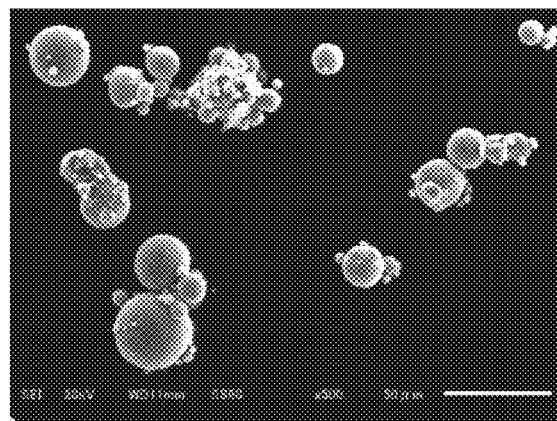
FIG. 13A is an example of an observed image of an aluminum particle group of comparative example 1.
Figure 13B:
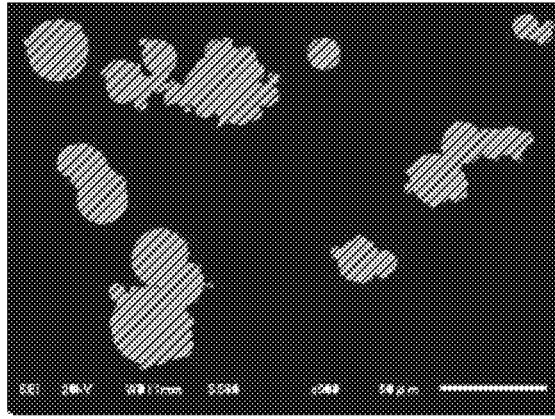
FIG. 13B is an image obtained by binarizing FIG. 13A and hatching aluminum particles determined as aluminum particles having satellites.
Figure 14A:
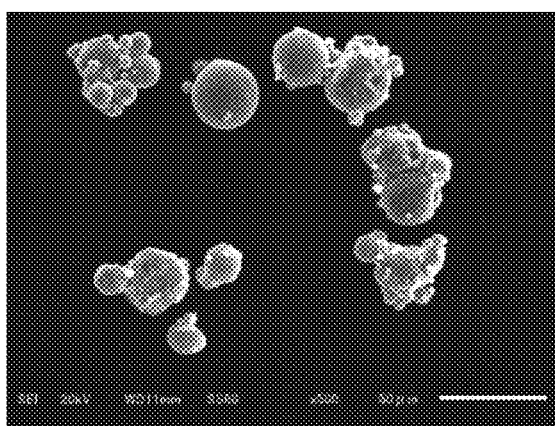
FIG. 14A is an example of an observed image of an aluminum particle group of comparative example 1.
Figure 14B:
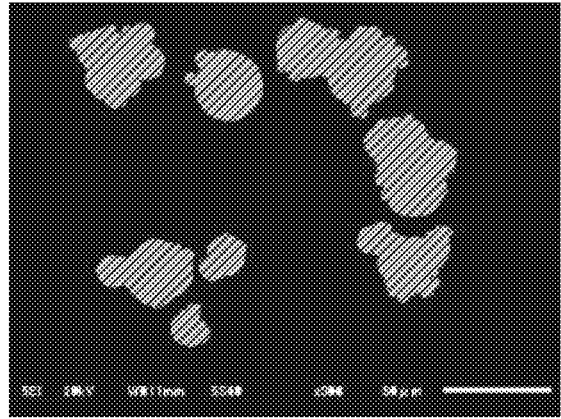
FIG. 14B is an image obtained by binarizing FIG. 14A and hatching aluminum particles determined as aluminum particles having satellites.
Figure 15A:
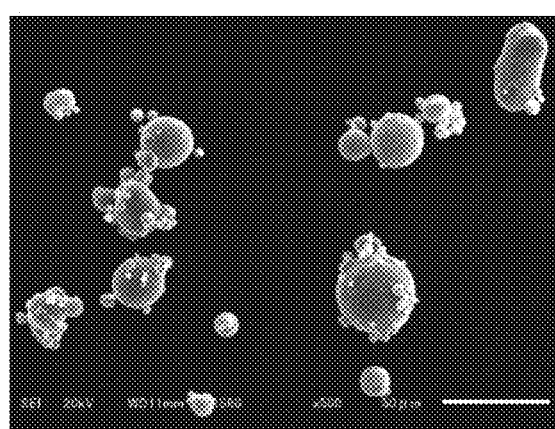
FIG. 15A is an example of an observed image of an aluminum particle group of comparative example 1.
Figure 15B:
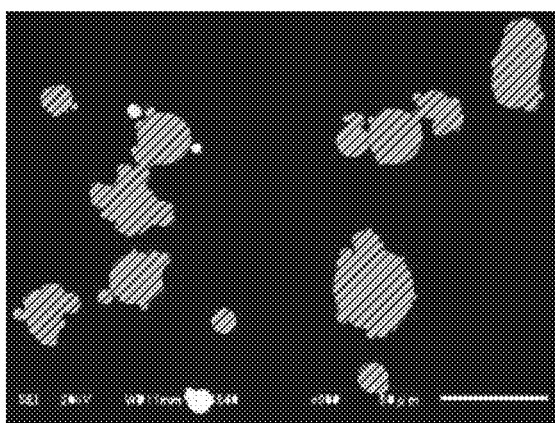
FIG. 15B is an image obtained by binarizing FIG. 15A and hatching aluminum particles determined as aluminum particles having satellites.
Figure 16:
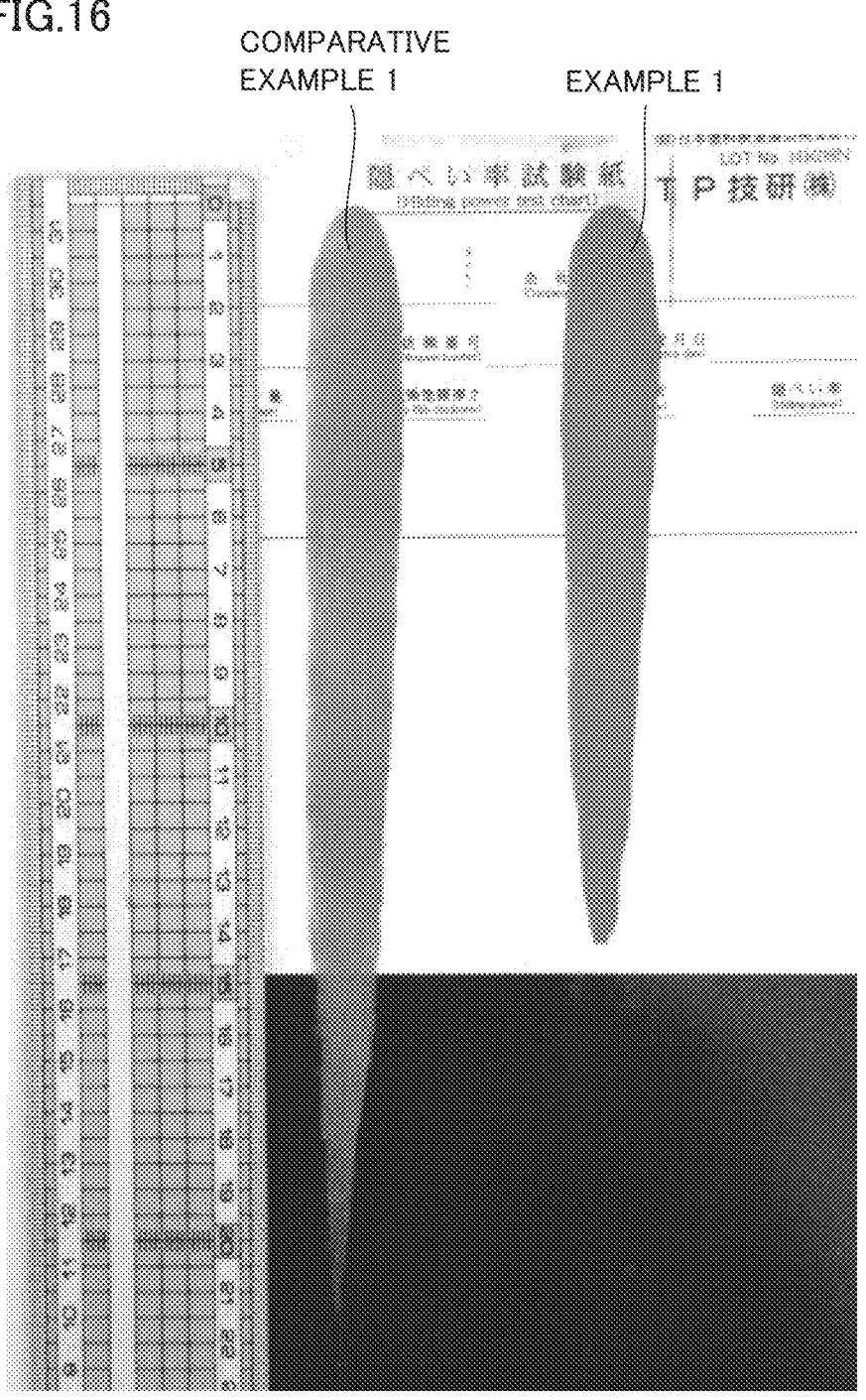
FIG. 16 shows a result of a test of spreading an aluminum particle group of Example 1 and that of Comparative Example 1.

Subsequently, as shown in FIG. 3A and FIG. 3B, a doctor blade 3 disposed to have a distance $d_2$ of 1 mil (mil: 25.3995 $\mu m$) from surface 1a is used to spread particle aggregate 2 in one direction (a direction indicated in FIGS. 2A and 2B by an arrow). This operation can be easily carried out by using a doctor blade having an open gap 3a of 1 mil. By the above operation, particle aggregate 2 is spread to be a particle aggregate 20.

When the aluminum particle group spread on surface 1a to form particle aggregate 20 is higher in fluidity, the aluminum particle group will be spread on the surface more densely and uniformly. That is, in FIGS. 3A and 3B, particle aggregate 20 will be spread at a high density in a narrow range. Therefore, the higher the aluminum particle group is in fluidity, the shorter a distance $d_3$ will be.

The aluminum particle group of the present embodiment allows distance $d_3$ in the above spreading test to be less than 20 cm. This distance is shorter than that of a conventional aluminum particle group, and accordingly, the aluminum particle group of the present embodiment will be excellent in fluidity. Why the aluminum particle group of the present embodiment is excellent in fluidity, as described above, is at least considered as follows:

An aluminum particle group having an average circularity closer to 1.00 tends to have aluminum particles closer to a spherical shape, and aluminum particles closer to a spherical shape tend to be higher in fluidity.

Furthermore, the aluminum particle group has a volumetric cumulative particle size distribution, and accordingly, will include aluminum particles having different diameters (a diameter herein means an equivalent circular diameter determined in the observed image described above) (that is, fine particles, medium particles and coarse particles, etc.). Such an aluminum particle group tends to be decreased in fluidity when it has many fine particles such as converted as having a diameter of less than 5 µm in the observed image. This is because the presence of fine particles increases the proportion of surface area compared to volume or mass, whereby the nature of the surface of the particle becomes dominant, and as a result the aluminum particle group's adhesive and cohesive property increases.

Furthermore, an aluminum particle group manufactured in a conventional manufacturing method includes what is determined in the above observed image as aluminum particles having satellites in a large amount. An aluminum particle group including a large amount of aluminum particles having satellites tends to be decreased in fluidity. This is because an aluminum particle having a satellite is two or more aluminum particles fused to each other and when it is compared with an aluminum particle with no satellite, the former tends to have a complicated shape and hence its own fluidity is low.

In contrast, the aluminum particle group of the present embodiment has a high average circularity of 0.75 or more and satisfies $A \times 3 \leq B$, and accordingly, contains fine particles having a diameter of less than 5 µm at a specifically low ratio, and it also satisfies $D < C$, and accordingly, contains aluminum particles having satellites at a specifically low ratio. As a result, the aluminum particle group of the present embodiment can have high fluidity.

The aluminum particle group of the present embodiment preferably has an average circularity of 0.85 or more, more preferably 0.87 or more. In that case, the aluminum particle group is more excellent in fluidity. Ideally, the average circularity has an upper limit value of 1.00.

The aluminum particle group of the present embodiment preferably satisfies $A \times 4 \leq B$, more preferably satisfies $A \times 5 \leq B$, and still more preferably satisfies $A \times 6 \leq B$. In that case, the aluminum particle group is more excellent in fluidity.

Furthermore, the aluminum particle group of the present embodiment preferably satisfies $A < E < B$, where E represents the number of aluminum particles having a diameter of 5 µm or more and less than 10 µm. In that case, the aluminum particle group is more excellent in fluidity.

Furthermore, the aluminum particle group of the present embodiment preferably satisfies $D \times 2 < C$, and more preferably satisfies $D \times 3 < C$. In that case, the aluminum particle group is more excellent in fluidity.

The aluminum particle group of the present embodiment preferably has an angle of repose of 40° or less, and more preferably 38° or less. In that case, the aluminum particle group is more excellent in fluidity. An "angle of repose" is a maximum angle of a slope that maintains stability without spontaneous collapse when heaping up the particle group. Note that while theoretically, an angle of repose preferably has a lower limit value of 0°, in practice it is rare that it is less than 10°.

The aluminum particle group of the present embodiment described in detail above can be suitably used as a raw material powder in a powder bed fusion 3D printer for additively manufacturing an object. This is because, for a powder bed fusion 3D printer, a closely dense powder bed formed of raw material powder for additively manufacturing an object brings a shaped object closer to perfection (or makes it less defective) and enhancing a powder bed in density requires that raw material powder for additively manufacturing an object has high fluidity.

Furthermore, the aluminum particle group of the present embodiment contains fine particles at a small ratio, and using it as a raw material powder for additively manufacturing an object suppresses generation of dust and thus allows a safe and hygienic operation to be performed.

In particular, the aluminum particle group of the present embodiment is applicable to raw material powder used in industrial metal 3D printers for additively manufacturing objects. Note that an "industrial metal 3D printer" is defined as an additive manufacturing apparatus in the ASTM standards.

In application to raw material powder for additively manufacturing an object, the aluminum particle group of the present embodiment has a $D_{50}$ preferably of 10 µm or more and less than 100 µm, more preferably 20 µm or more and less than 60 µm, still more preferably 15 µm or more and less than 40 µm, particularly preferably 20 µm or more and less than 25 µm. When an aluminum particle group with a $D_{50}$ of 100 µm or more is used in a 3D printer to additively manufacture an object, a single AM layer easily attains a height of 100 µm or more and thus tends to make it difficult to form a dense shaped object. On the other hand, an aluminum particle group with a $D_{50}$ of less than 10 µm is low in fluidity, and tends to make it difficult to form a powder bed.

[Method of Manufacturing Aluminum Particle Group]

The aluminum particle group according to the present embodiment can be manufactured in a method comprising the steps of: producing an atomized-particle group by an air open type gas atomization method (a particle production step); subsequently removing fine particles from the atomized-particle group by dry air classification (a fine particle removal step); and subsequently removing coarse particles from the atomized-particle group by using a sieve having meshes having a size of 40 to 75 µm (a coarse particle removal step). Hereafter, each step will be described.

(Particle Production Step)

In this step, initially, a melt of aluminum or an aluminum alloy which serves as a raw material for the aluminum particle group is produced in a melting furnace.

In the case of preparing a melt of aluminum, an aluminum ingot may be charged into the melting furnace, for example. The aluminum ingot may be high-purity aluminum having a purity of 99.9% by mass or more, or it may be an aluminum ingot containing 0.15% by mass or less of silicon (Si) and/or 0.2% by mass or less of iron (Fe) as impurity.

In the case of preparing a melt of an aluminum alloy, for example, an aluminum ingot may be charged into the melting furnace, and other elements may also be charged thereinto so that they are contained in the melt at ratios (in mass %) to achieve an intended composition.

Further, an aluminum alloy satisfying the intended composition may be charged into the melting furnace. For example, an aluminum alloy of 1000 to 8000 series, an aluminum alloy of 1000 to 8000 series with the above-indicated transition metal or rare earth element added thereto, or the like may be charged. More specifically, aluminum alloys generally represented as "Al-10 w % Si-0.4 w % Mg," "ADC12," "AC4CH," "Al-12 w % Si," "Al-40 w % Si" and the like can be suitably used.

When the melt of the aluminum alloy contains Si as a component other than Al, Si is preferably blended in an amount of 40% by mass or less, and when the melt of the aluminum alloy contains Mg as a component other than Al, Mg is preferably blended in an amount of 10% by mass or less. This is because when Si or Mg is blended in an amount exceeding the upper limit value indicated above, the melt tends to be reduced in fluidity or have a surface with an oxide excessively formed, and this easily causes clogging of a nozzle, which will be described hereinafter.

In this step, the melting furnace's internal temperature is preferably set to a temperature higher by 100° C. or more, more preferably by 150° C. or more, than the melting point of aluminum or the melting point of the aluminum alloy derived from the composition of the aluminum alloy. This can suppress unintentional solidification of the melt. While the melting furnace includes a heavy oil reverberatory furnace and a high frequency induction furnace, a high frequency induction furnace is preferably used in view of uniformly agitating the melt.

Subsequently, the melt in the melting furnace is subjected to an air open type gas atomization method to produce an atomized-particle group.

In the gas atomization method, a pipe having one end with a nozzle attached thereto has the other end immersed in the melt, and a high pressure gas is used to form a negative-pressure region near the nozzle to suck up the melt into the nozzle and atomize the melt through a mouth of the nozzle to thus produce particles (atomized particles).

While as the high pressure gas, air is widely used in a typical gas atomization method, in the present step, it is preferable to use an inert gas such as argon, helium, nitrogen or the like. In that case, after the melt is atomized, surface tension acts and thereafter the melt solidifies, and thereafter the solidified particles have their surfaces oxidized, so that more spherical particles can be produced than when air is used. When air is used as the high pressure gas, the atomized particles' surfaces start to oxidize immediately after the melt is atomized, and spherical particles are less easily formed.

While the high pressure gas is typically about 1 MPa in pressure, in this step it is preferably 1.5 MPa or more, more preferably 2.0 MPa or more. This allows more efficient crushing. Such a high pressure gas can be generated by using a compressor. The high pressure gas has an upper limit value in pressure set to 10 MPa in view of preparing particles to have a particle diameter applicable to raw material powder for additively manufacturing an object.

Herein, when an inert gas is used as the high pressure gas, a gas atomization method in a closed circuit system is typically performed for an economical point of view. However, the present inventors have confirmed that when an inert gas is used as the high pressure gas and the gas atomization method of the closed circuit type is performed, the resultant atomized particles tend to on one hand have a shape closer to a sphere but on the other hand have an increased number of particles having satellites. For this reason, in this step, an air open type gas atomization method is adopted. Note that the "closed circuit system" is a method in which an atmosphere when atomizing the melt into particles is a closed system filled with inertness such as nitrogen, and the "air open type" is a configuration in which the above atmosphere is an air open system.

The melt is ejected through the nozzle preferably in a vertically upward direction or a horizontal direction rather than a vertically downward direction. This is because the former more easily suppresses clogging of the nozzle due to oxide than the latter and also allows the nozzle to be periodically replaced with another more easily than the latter.

The nozzle is preferably an annular nozzle. This is because an annular supersonic jet stream easily produces fine powder. The nozzle has a mouth (hole) having a diameter preferably of 2.0 to 2.5 mm. This is because when atomized particles produced through such a nozzle undergo a fine particle removal step and a coarse particle removal step, which will be described later, the resultant, finally obtained aluminum particle group's $D_{50}$ is easily adjusted to 10 μm or more and less than 100 μm, and hence 20 μm or more and less than 60

(Fine Particle Removal Step)

In this step, the atomized-particle group produced through the particle production step undergoes dry air classification to have fine particles removed therefrom.

As the dry air classification, centrifugal airstream classification is suitably selected from a viewpoint of controllability in diameter for particles to be separated. Centrifugal airstream classification is a method in which an airstream including an atomized-particle group (a classifying airstream) is passed into a classifying chamber, in which a disk- or impeller-type rotor rotates, from a radially outer side to a radially inner side in the radial direction of the rotor to classify particles. The particles fed into the classifying chamber receive the centrifugal force caused by the rotor's rotating stream, and the drag of the air flowing in the radial direction of the rotor, and larger particles are more affected by the centrifugal force and smaller particles are more affected by the drag and the particles are thus classified.

The centrifugal airstream classification is performed with a classification point determined by appropriately adjusting the rotor's rotation speed and the classifying airstream's flow rate. In this step, various conditions are adjusted so that the classification point is 7 μm or more.

Herein, the classification point means a particle diameter for a point at which a graph of volumetric cumulative particle size distribution of the aluminum particle group rises when the classified powder is measured through laser diffraction. That is, when the classification point is 7 μm, there will be no particle having a particle diameter smaller than 7 μm detected in the classified aluminum-particle group. When the classification point is 7 μm or more, small particles of an extent regarded as "aluminum particles having a diameter less than 5 μm" in the observed image described above are efficiently removed. By conducting this step, it is believed that a finally obtained aluminum particle group can satisfy A×3≤B. Note that the classification point has an upper limit value set to 20 μm in view of yield.

(Coarse Particle Removal Step)

In this step, the atomized-particle group having undergone the fine particle removal step is passed through a sieve with meshes of 40 μm or more and 75 μm or less to have coarse particles removed therefrom.

The sieving is done preferably with a vibrating sieving machine. It is believed that using a sieve with meshes of 40 μm to 75 μm to sieve the atomized-particle group having undergone the fine particle removal step allows coarse particles to be appropriately removed and a finally obtained aluminum particle group to have a $D_{50}$ of 10 µm or more and less than 100 µm.

If the present step is performed without subjecting the atomized particles after the particle production step to the fine particle removal step, even particles having particle diameters other than those to be removed in the present step would also remain at the meshes of the sieve and an aluminum particle group as desired cannot be obtained.

By performing the particle production step, the fine particle removal step, and the coarse particle removal step in the stated order, the aluminum particle group of the present embodiment is produced. Further, the particles after the coarse particle removal step may be subjected to a blender or the like to be uniform to serve as an aluminum particle group.

EXAMPLES

While hereinafter the present invention will be described more specifically with reference to examples, the present invention is not limited by these examples. In the following examples and comparative examples various physical property values are measured as follows:

[1] Aluminum Particle Group's Volumetric Average Particle Diameter $D_{10}$, $D_{50}$, $D_{100}$ A laser diffraction type particle size distribution meter (Microtrac MT3300 manufactured by Nikkiso Co., Ltd.) was used to introduce an aluminum particle group into circulating water in a measurement system, ultrasonically disperse it for 180 seconds, and thereafter measure each particle's diameter.

[2] Composition of Aluminum Particle Group

An aluminum particle group was heated and dissolved in a compressing container, and an ICP device manufactured by Thermo Fisher Scientific Inc. was used to determine the aluminum particle group's composition through high frequency inductively coupled plasma emission spectrometry.

[3] Circularity of Aluminum Particle Group

A sample of an aluminum particle group for observation was prepared as described above, and observed with a scanning electron microscope (JSM-6510A manufactured by JEOL Ltd.) to obtain an image thereof at a magnification of 500 times. For a single aluminum particle group, 20 to 40 observed images were created while shifting the imaging position. A single observed image had a vertical size and a horizontal size each being 4 to 12 times of $D_{50}$, and included 15 or less aluminum particles, and by connecting all observed images together, the sample to be observed had its entire image observed.

For each aluminum particle group, 102 to 106 aluminum particles were randomly extracted from 20 to 40 observed images, and an image analysis was conducted using a two-dimensional measurement function (Real-time Measurement) of VHX-1000 of Keyence Corporation and the above described method was employed to calculate average circularity.

[4] Values A, B and E of Aluminum Particle Group

Using the observed images of the item [3], the above described method was employed to obtain an aluminum particle group's values A (the number of aluminum particles having a diameter less than 5 µm), B (the number of aluminum particles having a diameter of 10 µm or more) and E (the number of aluminum particles having a diameter of 5 µm or more and less than 10 µm).

[5] Values C and D of the Aluminum Particle Group

Using the observed image of the item [3], the above described method was employed to obtain an aluminum particle group's values C (the number of aluminum particles with no satellite) and D (the number of aluminum particles having satellites).

Example 1

To an aluminum alloy having a purity of 99.7% by mass, each element was added so that Si was 10% by mass and Mg was 0.4% by mass, and the resultant intermediate product was heated to prepare a melt of an aluminum alloy (Al-10 w % Si-0.4 w % Mg). Then, under the conditions indicated below, from this melt, atomized particles were supplied to an atomization line having an atomizing section, a cyclone section and a bag filter section (the particle production step). Thus, an atomized-particle group having $D_{50}$ of 21 µm was obtained.

Melt's temperature: 900° C.

Nozzle: annular nozzle with a diameter of 2.2 mm pressure of high pressure gas: 2.5 MPa.

Subsequently, the atomized particle group was subjected to dry air classification by a centrifugal airstream classifier (Turbo Classifier manufactured by Nisshin Engineering Inc.) (the fine particle removal step). The centrifugal classifier was controlled to have a classification point of 7 µm.

Subsequently, the classified atomized particle group was passed through a sieve having a mesh size of 45 µm (325 meshes), and thus subjected to dry sieving (i.e., the coarse particle removal step), and the atomized particle group having passed through the sieve was homogenized by a blender. An aluminum particle group of Example 1 was thus produced. The composition of the aluminum particle group of Example 1 was an alloy made of an aluminum alloy represented by (Al-10 w % Si-0.4 w % Mg).

Example 2

A method similar to that of Example 1 was employed except that each element was added so that 0.6% by mass of Si, 0.27% by mass of Cu, 1.0% by mass of Mg and 0.2% by mass of Cr were contained with respect to an Al ingot having a purity of 99.7% by mass. An aluminum particle group of Example 2 was thus produced. The composition of the aluminum particle group of Example 2 was an alloy made of an aluminum alloy of JIS A6061.

Example 3

A method similar to that of Example 1 was employed except that addition was made so that 0.7% by mass of Si was contained with respect to an Al ingot having a purity of 99.7% by mass. An aluminum particle group of Example 3 was thus produced. The composition of the aluminum particle group of Example 3 was an alloy made of an aluminum alloy represented as Al-7 w % Si.

Comparative Example 1

EOS Aluminum AlSi10 Mg of EOS GmbH was used as an aluminum particle group of Comparative Example 1. The composition of the aluminum particle group of Comparative Example 1 was an alloy made of an aluminum alloy represented as Al-10 w % Si-0.4 w % Mg.

Comparative Example 2

EOS Aluminum AlSi10 Mg of EOS GmbH underwent dry air classification similarly as done in Example 1. An aluminum particle group of Comparative Example 2 was thus produced.

Comparative Example 3

A method similar to that of Example 1 was employed except that dry air classification was not conducted. An aluminum particle group of Comparative Example 3 was thus produced.

Comparative Example 4

A method similar to that of Example 2 was employed except that dry air classification was not conducted. An aluminum particle group of Comparative Example 4 was thus produced.

Comparative Example 5

A method similar to that of Example 3 was employed except that dry air classification was not conducted. An aluminum particle group of Comparative Example 5 was thus produced.

(Measurement of Physical Properties)

The aluminum particle groups of Examples 1 to 3 and Comparative Examples 1 to 5 had their physical properties measured in the methods described at items [1] to [5]. Each result is shown in Tables 1 to 3. In Table 2, "-" means that each component was not detected (detection limit: 0.01% by mass).

TABLE 1

| | particle size distribution (μm) | | |
|---|---|---|---|
| | D10 | D50 | D90 |
| Example 1 | 13.9 | 24.2 | 40.5 |
| Example 2 | 12.3 | 23.2 | 41.7 |
| Example 3 | 13.4 | 21.5 | 35.2 |
| Comparative Example 1 | 13.9 | 28.7 | 46.7 |
| Comparative Example 2 | 16.0 | 30.1 | 47.1 |
| Comparative Example 3 | 5.8 | 15.5 | 31.4 |
| Comparative Example 4 | 7.9 | 20.4 | 40.2 |
| Comparative Example 5 | 6.5 | 17.0 | 32.5 |

TABLE 2

| | composition components (mass %) | | | | | | | | |
|---|---|---|---|---|---|---|---|---|---|
| | Cu | Fe | Si | Mn | Mg | Zn | Ni | Cr | Ti |
| Example 1 | — | 0.10 | 10.20 | — | 0.42 | — | 0.01 | — | 0.01 |
| Example 2 | 0.30 | 0.19 | 0.78 | — | 0.98 | 0.01 | 0.02 | 0.20 | 0.01 |
| Example 3 | — | 0.12 | 7.13 | — | — | 0.01 | 0.01 | — | 0.01 |
| Comparative Example 1 | — | 0.14 | 10.08 | — | 0.40 | 0.02 | — | — | 0.01 |
| Comparative Example 2 | — | 0.14 | 10.08 | — | 0.40 | 0.02 | — | — | 0.01 |
| Comparative Example 3 | — | 0.10 | 10.20 | — | 0.42 | — | 0.01 | — | 0.01 |
| Comparative Example 4 | 0.30 | 0.19 | 0.78 | — | 0.98 | 0.01 | 0.02 | 0.20 | 0.01 |
| Comparative Example 5 | — | 0.12 | 7.13 | — | — | 0.01 | 0.01 | — | 0.01 |

TABLE 3

| | | number of particles | | | | | |
|---|---|---|---|---|---|---|---|
| | circularity | total count | A | E | B | (A × 3)/B | D/C |
| Example 1 | 0.87 | 105 | 4 | 9 | 92 | 12/92 | 32/73 |
| Example 2 | 0.88 | 105 | 12 | 19 | 74 | 36/74 | 17/88 |
| Example 3 | 0.87 | 103 | 10 | 25 | 68 | 30/68 | 22/81 |
| Comparative Example 1 | 0.79 | 103 | 5 | 7 | 91 | 15/91 | 98/5 |
| Comparative Example 2 | 0.79 | 102 | 27 | 38 | 37 | 81/37 | 95/7 |
| Comparative Example 3 | 0.88 | 103 | 42 | 41 | 20 | 126/20 | 18/85 |
| Comparative Example 4 | 0.86 | 106 | 40 | 41 | 25 | 120/25 | 16/90 |
| Comparative Example 5 | 0.88 | 102 | 42 | 40 | 20 | 126/20 | 24/78 |

For reference, observed images of Example 1 are shown in FIGS. 4A, 5A, 6A, 7A, 8A, and 9A, and observed images of Comparative Example 1 are shown in FIGS. 10A, 11A, 12A, 13A, 14A, and 15A. FIG. 4B, FIG. 5B, FIG. 6B, FIG. 7B, FIG. 8B, FIG. 9B, FIG. 10B, FIG. 11B, FIG. 12B, FIG. 13B, FIG. 14B, and FIG. 15B are images obtained by binarizing FIG. 4A, FIG. 5A, FIG. 6A, FIG. 7A, FIG. 8A, FIG. 9A, FIG. 10A, FIG. 11A, FIG. 12A, FIG. 13A, FIG. 14A, and FIG. 15A, respectively, and hatching aluminum particles determined as aluminum particles having satellites.

(Spreading Test)

The above spreading test was performed using each aluminum particle group. Herein, as substrate 1, test paper for contrast ratio evaluation manufactured by TP Giken Co., Ltd. was used, and as doctor blade 3, a film applicator manufactured by Taiyu Kizai Co., Ltd. was used and moved by 25 cm. The test paper satisfied a general paint test method prescribed in JIS K 5600 and had a surface with an arithmetic mean roughness Ra of 0.5 μm.

The above spreading test was performed and each aluminum particle group was measured for a distance by which it was spread. A result thereof is shown in Table 4. In Table 4, "25.0 or more" means that even after doctor blade 3 was moved by 25 cm, aluminum particles which were not spread on the test paper were present on a side surface of doctor blade 3.

(Measurement of Angle of Repose)

The angle of repose of each aluminum particle group was measured using an ABD powder property measuring instrument manufactured by Tsutsui Scientific Instruments Co., Ltd. A result thereof is shown in table 4. Smaller angles of repose mean better fluidity. In measuring the angle of repose, the aluminum particle group was dropped via a funnel.

(Test of Additively Manufacturing an Object Using Powder Bed Fusion 3D Printer)

An attempt was made to additively manufacture an object by using EOSINT M 280 manufactured by EOS GmbH as a powder bed fusion 3D printer and each aluminum particle group as a raw material powder for additively manufacturing the object. In doing so, settings were done so that the object to be manufactured was to be shaped to be a cylinder having a diameter of 8 mm and a height of 15 mm and a single AM layer was to be made to have a height of 30 μm.

In the above additively manufacturing test, it was easy to form a powder bed from the aluminum particle groups of Examples 1 to 3, whereas it was difficult to form the powder bed from the aluminum particle groups of Comparative Examples 1 to 5. This is because most of the aluminum particles disposed for the powder bed was removed by the blade when the blade was moved to form the powder bed. A result thereof is shown in table 4. In Table 4, "PB" means a powder bed.

(Evaluation of Physical Property of Additively Manufactured Object)

An object of a column having a diameter of 6.4 mm and a height of 45 mm was additively manufactured using the aluminum particle groups of Examples 1 to 3 as a raw material powder for additively manufacturing the object. In doing so, a single AM layer's height was set to 30 For each additively manufactured object, each component's relative density with respect to true density was measured in Archimedes' Method. A result thereof is shown in table 4.

Furthermore, each additively manufactured object was turned to form a round bar test piece having a diameter of 3.5 mm in cross section and a thickness of 18 mm, which was in turn subjected to a tensile test using an Instron type tensile tester (INSTRON MODEL 4206) at a pulling rate of 1 mm/min. to measure each test piece's tensile strength. A result thereof is shown in table 4.

TABLE 4

| | aluminum particle group | | additive manufacturability & additively manufactured object | | |
|---|---|---|---|---|---|
| | spreading test (cm) | angle of repose (degrees) | formability of PB | relative density (%) | tensile strength (MPa) |
| Example 1 | 14.5 | 38 | formable | 99.9 | 470 |
| Example 2 | 11.0 | 37 | formable | 98.2 | 155 |
| Example 3 | 14.0 | 37 | formable | 99.6 | 385 |
| Comparative Example 1 | 21.0 | 43 | difficult | — | — |
| Comparative Example 2 | 22.5 | 42 | difficult | — | — |
| Comparative Example 3 | 25.0 or more | 46 | difficult | — | — |
| Comparative Example 4 | 25.0 or more | 42 | difficult | — | — |
| Comparative Example 5 | 25.0 or more | 49 | difficult | — | — |

It has been confirmed that the additively manufactured objects formed of the aluminum particle groups of Examples 1 to 3 can endure practical use in terms of relative density and tensile strength.

When the aluminum particle groups of Comparative Examples 1 to 5 were dried at 100° C. for 12 hours and again subjected to the above additively manufacturing test, it was still difficult to form a powder bed from the aluminum particle groups of Comparative Examples 2 to 5, whereas it was possible to form a powder bed from the aluminum particle group of Comparative Example 1. It was believed that this was because the drying step volatilized moisture contained in the powder and thus improved fluidity.

Furthermore, for the aluminum particle groups of Comparative Examples 3 to 5 produced through a process equivalent to that for Examples 1 to 3 except that the dry air classification was not performed, various conditions were investigated to additively manufacture an object, and an additively manufactured object was barely obtained by extremely reducing a speed at which the blade was moved. However, the blade was moved at an extremely low speed, which was considered impractical in terms of manufacturing cost and manufacturing tact.

Furthermore, it has been confirmed that objects additively manufactured from the aluminum particle groups of comparative examples 3 to 5 were inferior in any physical property of relative density and tensile strength to those additively manufactured from the aluminum particle groups of Examples 1 to 3.

While embodiments and examples of the present invention have been described as above, it is also initially planned to combine configurations of the embodiments and examples, as appropriate.

It should be understood that the embodiment and example disclosed herein have been described for the purpose of illustration only and in a non-restrictive manner in any respect. The scope of the present invention is defined by the terms of the claims, rather than the description above, and is intended to include any modifications within the meaning and scope equivalent to the terms of the claims.

REFERENCE SIGNS LIST

1: substrate, 1a: surface, 2, 20: particle aggregate, 3: doctor blade, 3a: open gap.

The invention claimed is:

1. An aluminum particle group composed of aluminum particles, wherein in an image of the aluminum particle group, as observed with a scanning electron microscope, the aluminum particle group has an average circularity of 0.75 or more, and an average particle diameter $D_{50}$ of 20 μm or more and less than 60 μm, and satisfies A×3≤B and also satisfies A<E<B and D×2<C, where A represents the number of aluminum particles having a diameter of less than 5 μm, E represents the number of aluminum particles having a diameter of 5 μm or more and less than 10 μm, B represents the number of aluminum particles having a diameter of 10 μm or more, C represents the number of aluminum particles with no satellite, and D represents the number of aluminum particles having satellites.

2. The aluminum particle group according to claim 1, wherein the aluminum particle group has an angle of repose of 40° or less.

3. A method for using the aluminum particle group according to claim 1, the method comprising using the aluminum particle group as a raw material powder for additively manufacturing an object in a powder bed fusion 3D printer.

4. A method for manufacturing an aluminum particle group according to claim 1, comprising:

producing an atomized-particle group by an air open type gas atomization method;

subsequently removing fine particles from the atomized-particle group through dry air classification; and subsequently removing coarse particles from the atom-
       ized-particle group by using a sieve having meshes of
       40 μm or more and 75 μm or less.

5. The aluminum particle group according to claim 1, wherein the aluminum particle group satisfies $A \times 4 \leq B$.

6. The aluminum particle group according to claim 1, wherein the aluminum particle group satisfies $A \times 5 \leq B$.

7. The aluminum particle group according to claim 1, wherein the aluminum particle group satisfies $A \times 6 \leq B$.

8. The aluminum particle group according to claim 1, wherein the aluminum particle group satisfies $D \times 3 < C$.

\* \* \* \* \*